US012675119B2

(12) United States Patent (10) Patent No.: US 12,675,119 B2
Kang et al. (45) Date of Patent: Jul. 7, 2026

(54) METHOD OF MANAGING A DEPARTURE OF AN AUTOMATED GUIDED VEHICLE AND A DEPARTURE MANAGEMENT SYSTEM OF AN AUTOMATED GUIDED VEHICLE PERFORMING THE SAME

(71) Applicant: Samsung Display Co., LTD., Yongin-si (KR)

(72) Inventors: Kyu Young Kang, Yongin-si (KR); Jaewan Kim, Yongin-si (KR); Jangho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 83 days.

(21) Appl. No.: 18/677,569

(22) Filed: May 29, 2024

(65) Prior Publication Data

US 2025/0053181 A1 Feb. 13, 2025

(30) Foreign Application Priority Data

Aug. 11, 2023 (KR) ........................ 10-2023-0105817

(51) Int. Cl.
| | |
|---|---|
| *G05D 1/667* | (2024.01) |
| *G05D 105/28* | (2024.01) |
| *G05D 107/70* | (2024.01) |

(52) U.S. Cl.
CPC ......... *G05D 1/667* (2024.01); *G05D 2105/28* (2024.01); *G05D 2107/70* (2024.01)

(58) Field of Classification Search
None
See application file for complete search history.

(56) References Cited

U.S. PATENT DOCUMENTS

| | | | |
|---|---|---|---|
| 10,954,067 B1 * | 3/2021 | Theobald ............... | B25J 19/022 |
| 2021/0032029 A1 * | 2/2021 | Rasmussen .......... | G06Q 10/087 |

FOREIGN PATENT DOCUMENTS

KR 20060072943 A 6/2006

* cited by examiner

*Primary Examiner* — Tamara L Weber
(74) *Attorney, Agent, or Firm* — CANTOR COLBURN LLP

(57) ABSTRACT

A method of managing a departure of an automated guided vehicle includes generating a work order for transporting an article stored on shelves immediately next to a first port from the first port to a second port and setting a priority of the work order, generating a movement order for moving the automated guided vehicle from a current point of the automated guided vehicle to the first port based on the work order and the priority of the work order, determining a queue value of the first port which is a number of the shelves storing the article included in the first port, and setting a port priority based on the queue value of the first port and resetting the priority of the work order based on the port priority.

20 Claims, 6 Drawing Sheets

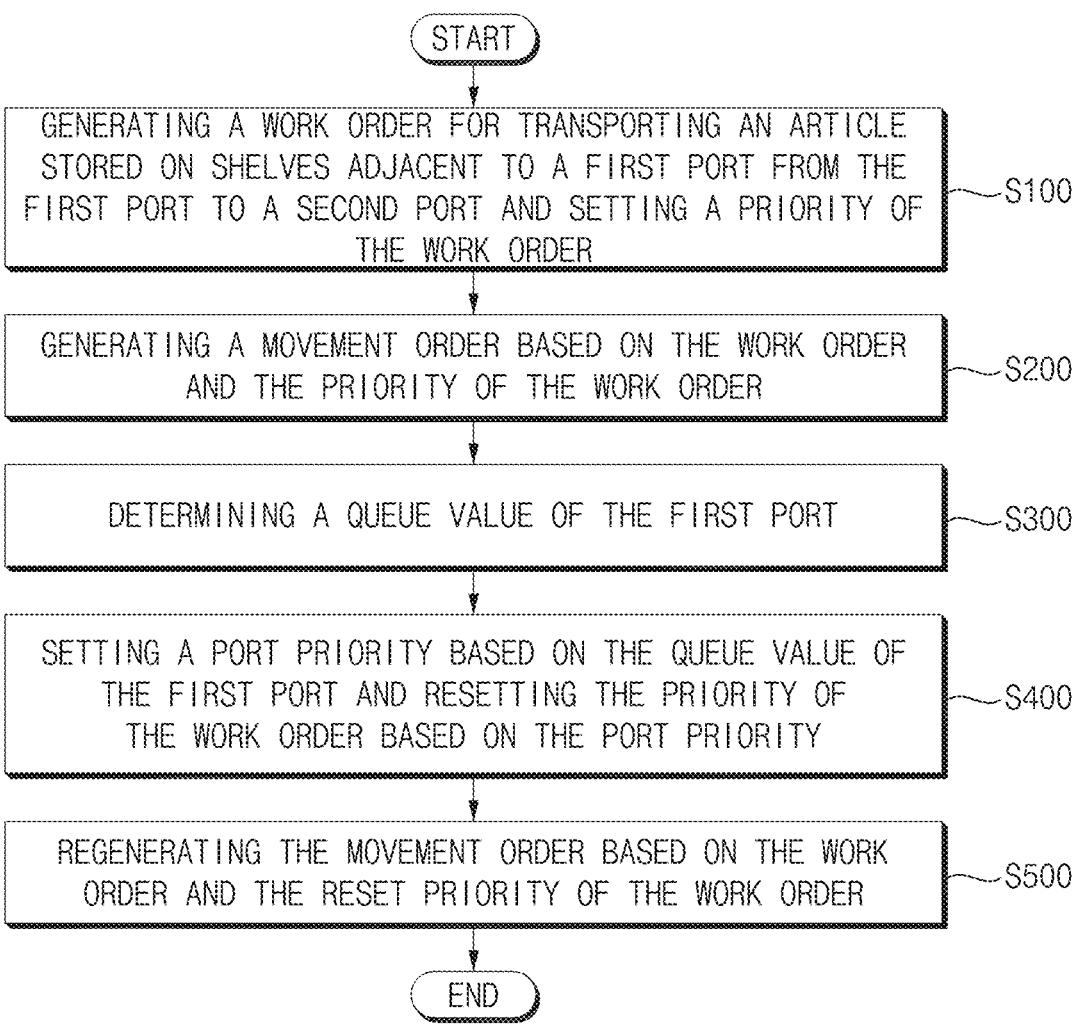

START

GENERATING A WORK ORDER FOR TRANSPORTING AN ARTICLE
STORED ON SHELVES ADJACENT TO A FIRST PORT FROM THE
FIRST PORT TO A SECOND PORT AND SETTING A PRIORITY OF
THE WORK ORDER                                    ~S100

GENERATING A MOVEMENT ORDER BASED ON THE WORK ORDER
AND THE PRIORITY OF THE WORK ORDER                ~S200

DETERMINING A QUEUE VALUE OF THE FIRST PORT       ~S300

SETTING A PORT PRIORITY BASED ON THE QUEUE VALUE OF
THE FIRST PORT AND RESETTING THE PRIORITY OF
THE WORK ORDER BASED ON THE PORT PRIORITY         ~S400

REGENERATING THE MOVEMENT ORDER BASED ON THE WORK
ORDER AND THE RESET PRIORITY OF THE WORK ORDER    ~S500

END

FIG. 6

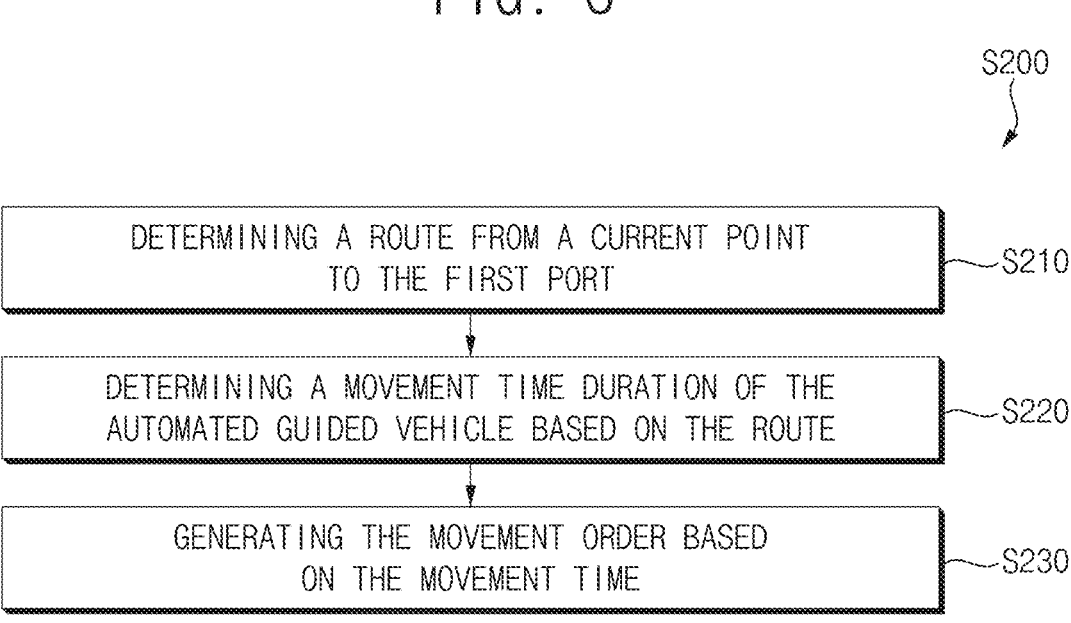

S200

| DETERMINING A ROUTE FROM A CURRENT POINT TO THE FIRST PORT | ~S210 |

| DETERMINING A MOVEMENT TIME DURATION OF THE AUTOMATED GUIDED VEHICLE BASED ON THE ROUTE | ~S220 |

| GENERATING THE MOVEMENT ORDER BASED ON THE MOVEMENT TIME | ~S230 |

FIG. 7

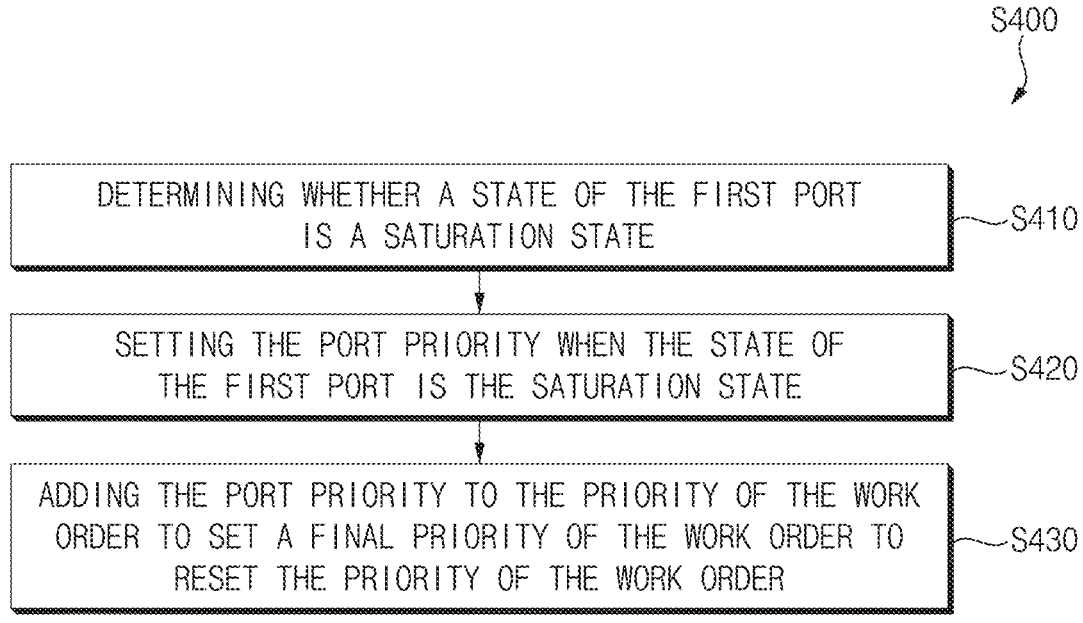

S400

| DETERMINING WHETHER A STATE OF THE FIRST PORT IS A SATURATION STATE | ~S410 |

| SETTING THE PORT PRIORITY WHEN THE STATE OF THE FIRST PORT IS THE SATURATION STATE | ~S420 |

| ADDING THE PORT PRIORITY TO THE PRIORITY OF THE WORK ORDER TO SET A FINAL PRIORITY OF THE WORK ORDER TO RESET THE PRIORITY OF THE WORK ORDER | ~S430 |

1

METHOD OF MANAGING A DEPARTURE OF AN AUTOMATED GUIDED VEHICLE AND A DEPARTURE MANAGEMENT SYSTEM OF AN AUTOMATED GUIDED VEHICLE PERFORMING THE SAME

This application claims priority to Korean Patent Application No. 10-2023-0105817, filed on Aug. 11, 2023, and all the benefits accruing therefrom under 35 U.S.C. § 119, the content of which in its entirety is herein incorporated by reference.

BACKGROUND

1. Field

Embodiments of the inventive concept relate to a method of managing a departure of an automated guided vehicle and a departure management system of an automated guided vehicle performing the same. More particularly, embodiments of the inventive concept relate to a method of managing a departure of an automated guided vehicle and a departure management system of an automated guided vehicle performing the same in a real time.

2. Description of the Related Art

An automated guided vehicle is one of automated equipment used in a production plant, etc., and carries out a work order for transporting an article (e.g., a substrate) while moving according to a set layout.

A departure management system of the automated guided vehicle generates the work order for transporting the article, and outputs a movement order for moving the automated guided vehicle from a current point of the automated guided vehicle to a starting point (e.g., a first port included in a first stocker) storing the article to the automated guided vehicle. The automated guided vehicle loads the article at the starting point and unloads the loaded article at a destination point (e.g., a second port included in a second stocker). A stocker includes ports and shelves adjacent to each of the ports. At least one of the shelves may be in a state to store the article, and other shelves may not be storing the article.

SUMMARY

When a number of shelves waiting to be transported at the starting point is relatively large, a process efficiency may decrease. Therefore, it is desired to preferentially depart the automated guided vehicle at the starting point where the number of shelves waiting to be transported is large.

Embodiments of the inventive concept provide a method of managing a departure of an automated guided vehicle for controlling a number of shelves waiting to be transported.

Embodiments of the inventive concept provide a departure management system of an automated guided vehicle for controlling a number of the shelves waiting to be transported.

In an embodiment of a method of managing a departure of an automated guided vehicle according to the inventive concept, the method includes generating a work order for transporting an article stored on shelves immediately next to a first port from the first port to a second port and setting a priority of the work order, generating a movement order for moving the automated guided vehicle from a current point of the automated guided vehicle to the first port based on the work order and the priority of the work order, determining a queue value of the first port which is a number of the shelves storing the article included in the first port, and setting a port priority based on the queue value of the first port and resetting the priority of the work order based on the port priority.

In an embodiment, as the priority of the work order is higher, the work order may be more preferentially assigned to the automated guided vehicle.

In an embodiment, as the port priority increases, the priority of the work order may increase.

In an embodiment, the resetting the priority of the work order based on the port priority may include determining whether a state of the first port is a saturation state, and setting the port priority when the state of the first port is the saturation state.

In an embodiment, the state of the first port may be determined based on a storage rate of the first port corresponding to the queue value of the first port, and when the storage rate of the first port is higher than a reference value, the state of the first port may be determined to be the saturation state.

In an embodiment, the storage rate of the first port may be a ratio of the queue value of the first port to a total number of the shelves immediately next to the first port.

In an embodiment, as the storage rate of the first port increases, the port priority may increase.

In an embodiment, the reference value may be 0.95.

In an embodiment, the resetting the priority of the work order may further include adding the port priority to the priority of the work order to set a final priority of the work order to reset the priority of the work order.

In an embodiment, the method may further include regenerating the movement order based on the work order and a reset priority of the work order.

In an embodiment, the article may be a substrate loaded in a cassette.

In an embodiment, the generating the movement order for moving the automated guided vehicle from the current point to the first port may include determining a route from the current point to the first port, determining a movement time duration of the automated guided vehicle based on the route, and generating the movement order based on the movement time duration.

In an embodiment, when a number of the route is one, the route may be determined as a final route of the automated guided vehicle, and when the number of the route is at least two, the movement time duration may be determined for each of candidate routes, and a shortest time route among the candidate routes is determined as the final route.

In an embodiment of a departure management system according to the inventive concept, the departure management system includes a first host which generates a work order for transporting an article stored on shelves immediately next to a first port from the first port to a second port and set a priority of the work order, a first controller which generates a movement order for moving the automated guided vehicle from a current point of the automated guided vehicle to the first port based on the work order and the priority of the work order, a second controller which determines a queue value of the first port which is a number of the shelves storing the article included in the first port, and a second host which sets a port priority based on the queue value of the first port. The first controller resets the priority of the work order based on the port priority.

In an embodiment, as the priority of the work order is higher, the work order may be more preferentially assigned to the automated guided vehicle.

In an embodiment, as the port priority increases, the priority of the work order may increase.

In an embodiment, the second host may determine whether state of the first port is a saturation state and to set the port priority when the state of the first port is the saturation state.

In an embodiment, the state of the first port may be determined based on a storage rate of the first port corresponding to the queue value of the first port, and when the storage rate of the first port is higher than a reference value, the state of the first port may be determined to be the saturation state.

In an embodiment the storage rate of the first port may be a ratio of the queue value of the first port to a total number of the shelves immediately next to the first port.

In an embodiment, as the storage rate of the first port increases, the port priority may increase.

According to the method and the departure management system to the embodiments, the method and the departure management system may set the port priority based on the number of the shelves storing the article among the shelves immediately next to the first port, and reset the priority of the work order based on the port priority. Since the number of the shelves storing the article is checked in a real time, the automated guided vehicle may be departed preferentially to the first port with a relatively large number of the shelves storing the article. Therefore, a process efficiency may be effectively managed.

BRIEF DESCRIPTION OF THE DRAWINGS

The above and other features of embodiments of the inventive concept will become more apparent by describing in detailed embodiments thereof with reference to the accompanying drawings, in which:

FIG. 2 is a diagram illustrating in detail a departure management system of an automated guided vehicle of FIG. 1

FIG. 5 is a flow chart illustrating a method of managing a departure of an automated guided vehicle performed by a departure management system of the automated guided vehicle;

FIG. 6 is a flowchart illustrating in detail generating a movement order for moving an automated guided vehicle from a current point to a first port in a method of managing a departure of an automated guided vehicle in FIG. 5; and FIG. 7 is a flowchart in detail resetting a priority of a work order in a method of managing a departure of an automated guided vehicle in FIG. 5.

DETAILED DESCRIPTION

Figure 1:
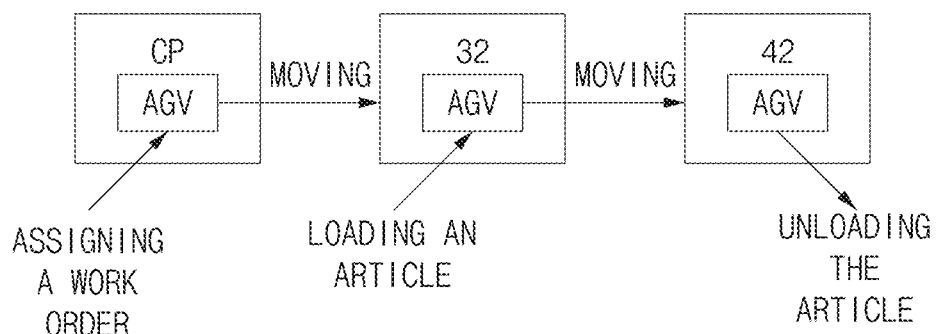
FIG. 1 is a conceptual diagram illustrating a departure management system of an automated guided vehicle.

Hereinafter, embodiments of the inventive concept will be described in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

The term "host" or "controller" as used herein is intended to mean a hardware component that performs a predetermined function. The hardware component may be a circuitry including a field-programmable gate array ("FPGA") or an application-specific integrated circuit ("ASIC"), for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a conceptual diagram illustrating a departure management system of an automated guided vehicle.

Referring to FIG. 1, an automated guided vehicle AGV may be assigned a work order at a current point CP of the automated guided vehicle AGV. The work order may include a content or an instruction that the automated guided vehicle AGV moves to a starting point 32 (e.g., a first port included in a first stocker), loads an article, moves to a destination point 42 (e.g., a second port included in a second stocker), and unloads the article. In an embodiment, the article is a substrate.

Figure 2:
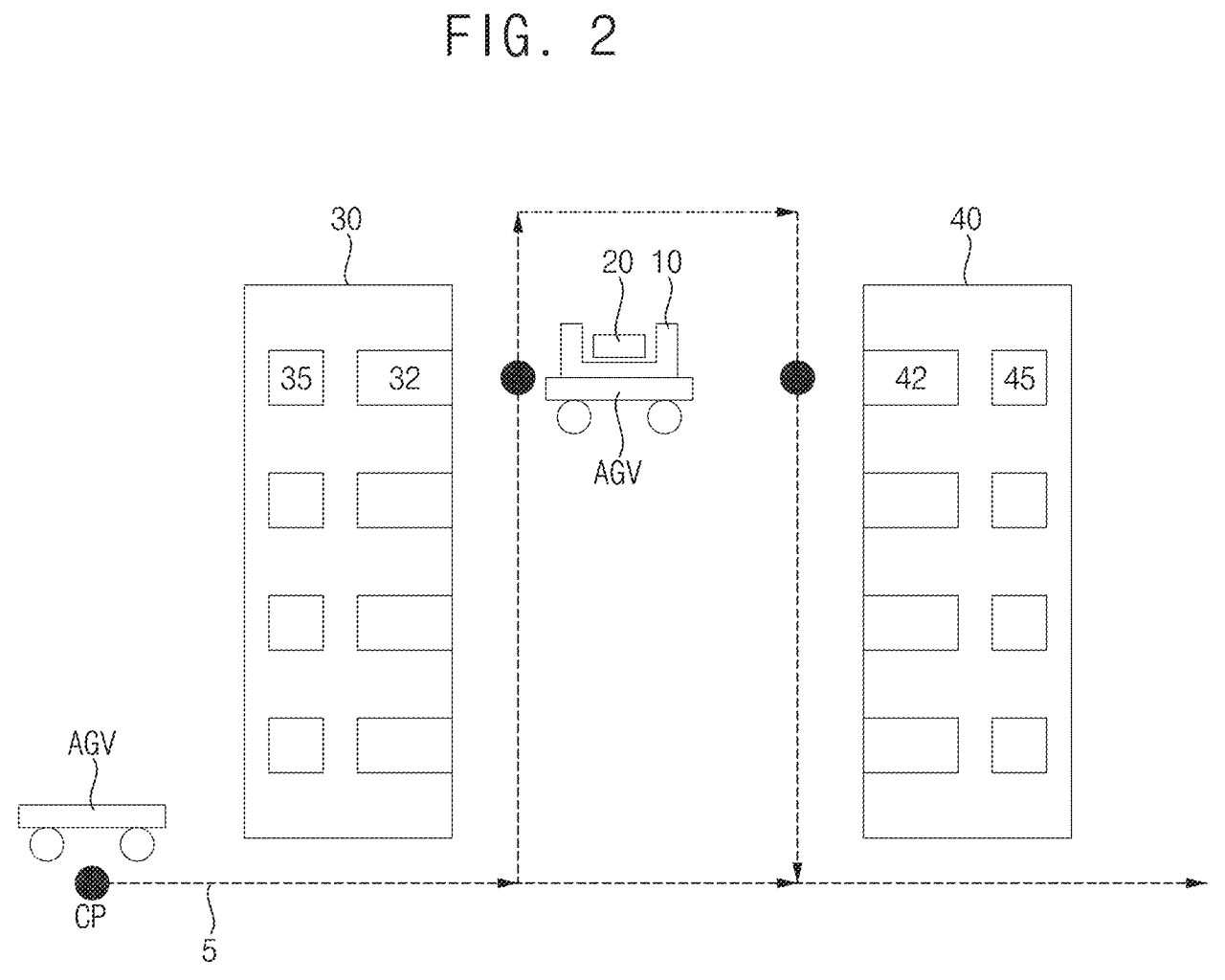

FIG. 2 is a diagram illustrating in detail a departure management system of an automated guided vehicle of FIG. 1.

Referring to FIGS. 1 and 2, the automated guided vehicle AGV may be assigned the work order at the current point CP, and the automated guided vehicle AGV may move from the current point CP to the first port 32 included in the first stocker 30 based on the work order. In an embodiment, the automated guided vehicle AGV may move from the current point CP to the first port 32 along a route 5, which will be described in detail later.

The first stocker 30 may include the first port 32 and shelves 35 adjacent to (e.g., immediately next to) the first port 32. Each of the shelves 35 may store cassettes 10, and each of the cassettes 10 may store the article 20. The first port 32 may be a passage through which the cassette 10 including the article 20 moves between the shelves 35 and the automated guided vehicle AGV.

The automated guided vehicle AGV may load the cassette 10 including the article 20 in the first port 32 and move to the second port 42 included in the second stocker 40.

The second stocker 40 may include the second port 42 and second shelves 45 adjacent to the second port 42. Each of the second shelves 45 may store cassettes 10, and each of the cassettes 10 may store the article 20. The second port 42 may be a passage through which the cassette 10 including the article 20 moves between the second shelves 45 and the automated guided vehicle AGV.

Figure 3A:
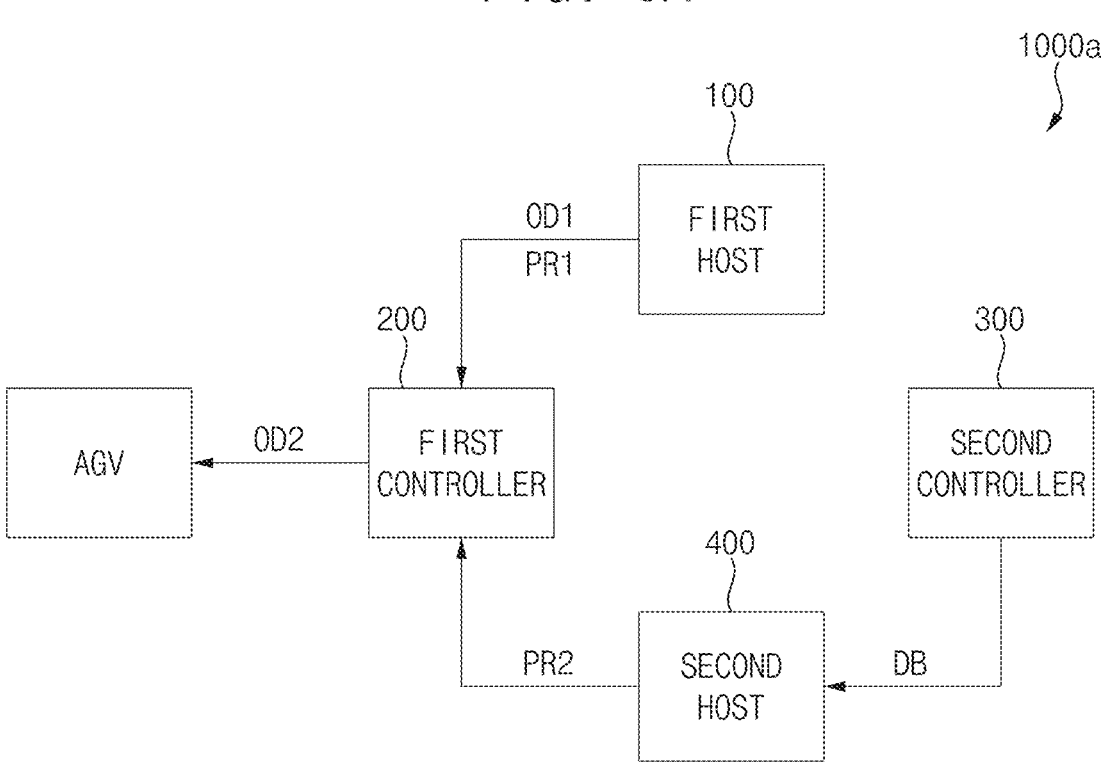
FIGS. 3A and 3B are block diagrams illustrating embodiments of a departure management system of an automated guided vehicle according to the inventive concept.
Figure 3B:
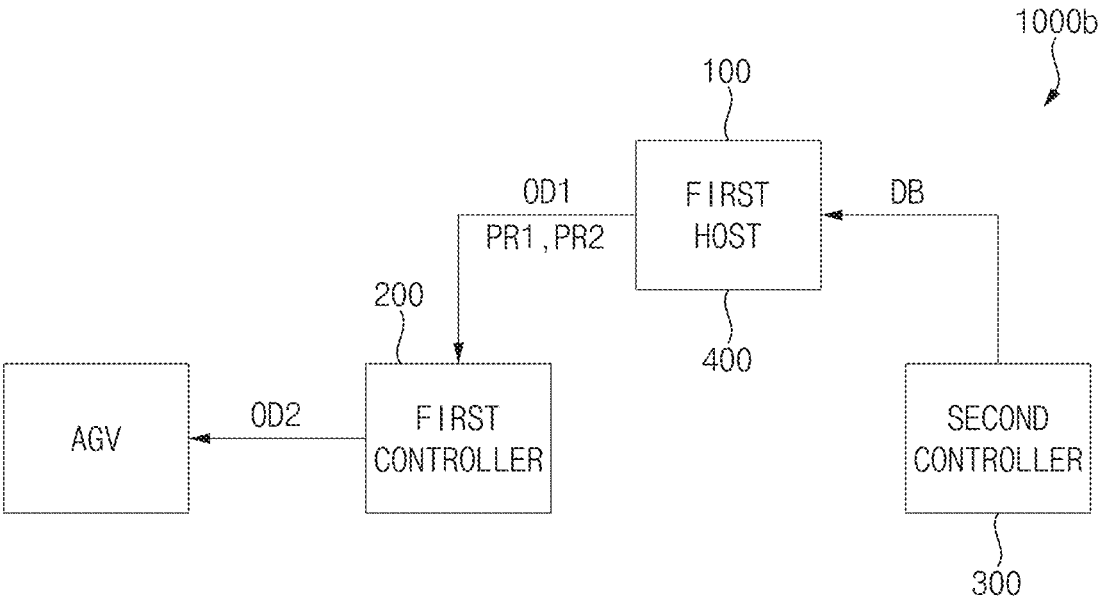

FIGS. 3A and 3B are block diagrams illustrating embodiments of a departure management system of an automated guided vehicle according to the inventive concept.

Referring to FIG. 3A, a departure management system 1000a of an automated guided vehicle AGV may include a first host 100, a first controller 200, a second controller 300, and a second host 400. In an embodiment, as shown in FIG. 3A, the first host 100 and the second host 400 may be provided separately. In an embodiment, as shown in FIG. 3B, the first host 100 and the second host 400 may be unitary as one body.

The first host 100 may control the first controller 200 and the second controller 300. The first host 100 may generate the work order OD1 for transporting the article 20 stored on the shelves 35 adjacent to the first port 32 from the first port 32 to the second port 42 and set the priority PR1 of the work order OD1. As the priority PR1 of the work order OD1 is higher, the work order OD1 may be assigned more preferentially to the automated guided vehicle AGV. In an embodiment, the priority PR1 of the work order OD1 may have a positive integer between 1 and 100, for example.

The first controller 200 may generate a movement order OD2 based on the work order OD1 and the priority PR1 of the work order OD1. The first controller 200 may control the automated guided vehicle AGV based on the movement order OD2. In an embodiment, the automated guided vehicle AGV may move from the current point CP to the first port 32 based on the movement order OD2, for example. In an embodiment, the automated guided vehicle AGV may move from the first port 32 to the second port 42 based on the movement order OD2, for example.

The second controller 300 may control the first stocker 30 and the second stocker 40. In an embodiment, the second controller 300 may determine a number of shelves 35 storing the article 20 included in the first port 32, for example. The number of shelves 35 storing the article 20 included in the first port 32 may be also referred to as a queue value DB of the first port 32. The queue value DB of the first port 32 may be checked in a real time.

When the queue value DB of the first port 32 is relatively large, the number of the shelves 35 storing the article 20 included in the first port 32 is relatively large such that a state of the first port 32 may be a saturation state, and a process efficiency may low. The saturation state may be a state in which the process efficiency is relatively low due to a relatively large number of shelves waiting to be transported. The saturation state may be determined based on a storage rate of the first port 32 corresponding the queue value DB of the first port 32. The storage rate of the first port 32 may be a ratio of the queue value of the first port 32 to a total number of shelves 35 adjacent to the first port 32. When the storage rate of the first port 32 is higher than a reference value, the state of the first port 32 may be determined to be the saturation state. In an embodiment, the reference value may be 0.95. In order to increase the process efficiency, the storage rate of the first port 32 may be controlled to be lower than the reference value. In an embodiment, when the storage ratio of the first port 32 is 0.70, the process efficiency may be optimal, for example. Therefore, it is desired to preferentially depart the automated guided vehicle AGV to the first port 32 where the number of shelves waiting to be transported is large. In summary, when the queue value DB of the first port 32 is relatively large, it is desired to preferentially depart the automated guided vehicle AGV to the first port 32.

The second host 400 may receive the queue value DB of the first port 32. The second host 400 may determine whether the state of the first port 32 is the saturation state based on the queue value DB of the first port 32. The second host 400 may set a port priority PR2 based on the queue value DB of the first port 32. In an embodiment, when the queue value DB of the first port 32 increases (i.e., the storage rate of the first port 32 increases), the port priority PR2 may increase, for example. In an embodiment, when the queue value DB of the first port 32 decreases (i.e., the storage rate of the first port 32 decreases), the port priority PR2 may decrease, for example.

The first controller 200 may reset the priority PR1 of the work order OD1 based on the port priority PR2. In an embodiment, the first controller 200 may add the port priority PR2 to the priority PR1 of the work order OD1 to set a final priority of the work order OD1 to reset the priority PR1 of the work order OD1. In an embodiment, the priority PR1 of the work order OD1 set by the first host 100 may be 40 and the port priority PR2 may be 3. In this case, the final priority of the work order OD1 (i.e., the priority of the work order OD1 reset by the first controller 200) may be 43, for example. Therefore, the automated guided vehicle AGV may be departed preferentially to the first port 32 after resetting the priority PR1 of the work order OD1.

Referring to FIG. 3B, a departure management system 1000b of an automated guided vehicle AGV in FIG. 3B has a substantially similar configuration to the departure management system 1000a of the automated guided vehicle in FIG. 3A, except that the second host 400 is not provided separately. Therefore, redundant descriptions are omitted.

The departure management system 1000b of the automated guided vehicle AGV may include a first host 100, a first controller 200, and a second controller 300. Unlike the departure management system 1000a of the automated guided vehicle AGV in FIG. 3A, the departure management system 1000b of the automated guided vehicle AGV in FIG. 3B may not include the second host 400 separately. In this case, an operation of the second host 400 may be performed by the first host 100. That is, the first host 100 may receive the queue value DB of the first port 32. The first host 100 may determine whether the state of the first port 32 is the saturation state based on the queue value DB of the first port 32. The first host 100 may set the port priority PR2 based on the queue value DB of the first port 32.

The first controller 200 may regenerate the movement order OD2 based on the work order OD1 and the reset priority (i.e., the final priority) of the work order OD1.

Figure 4:
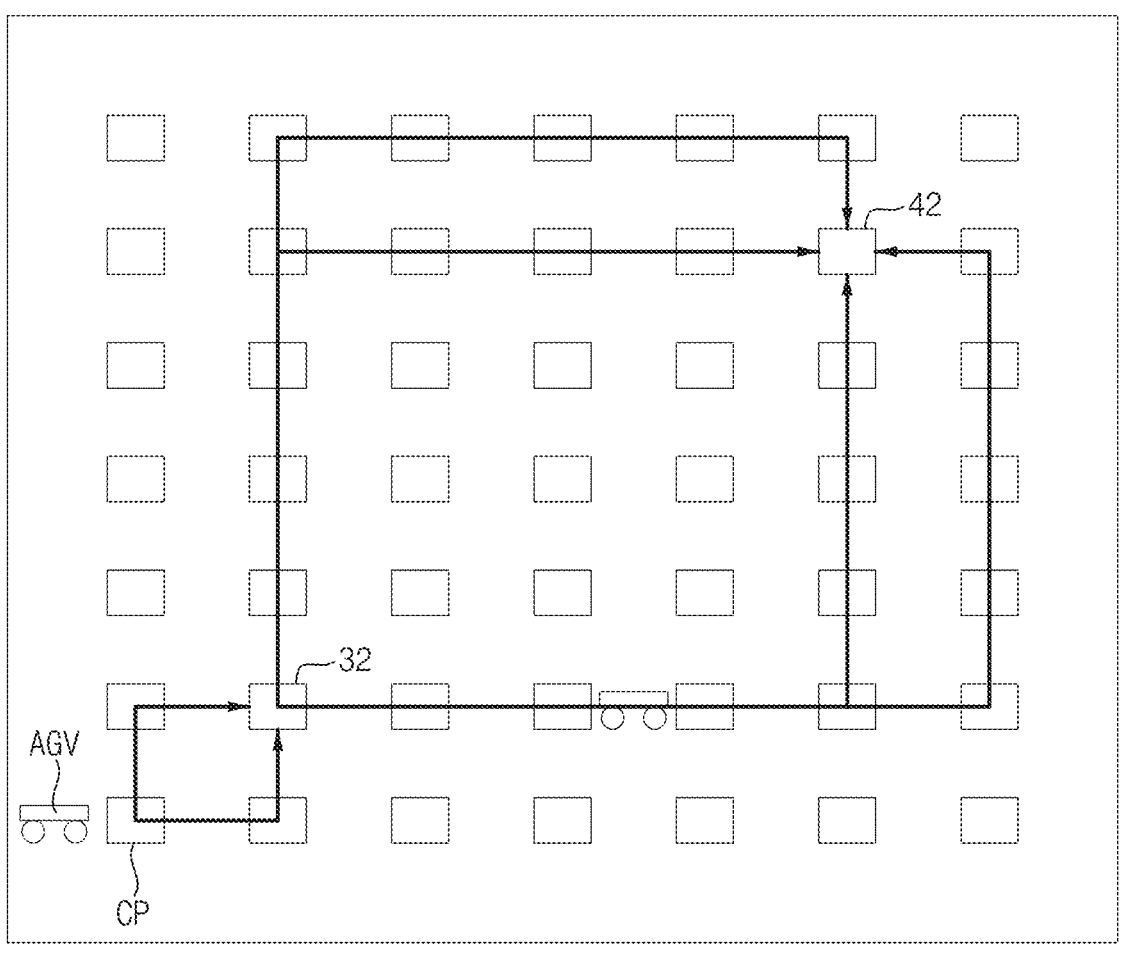
FIG. 4 is a conceptual diagram describing a movement time duration from a current point of an automated guided vehicle of FIGS. 3A to 3B to a first port.

FIG. 4 is a conceptual diagram describing a movement time duration from a current point of an automated guided vehicle of FIGS. 3A and 3B to a first port.

Referring to FIG. 4 along with FIGS. 2, 3A and 3B, the first controller 200 may generate the movement order OD2 based on the work order OD1 and the priority PR1 of the work order OD1. Specifically, the first controller 200 may determine a route 5 from the current point CP to the first port 32. In an embodiment, a number of route 5 may be one, and when the number of route 5 is one, the one route 5 may be determined as a final route of the automated guided vehicle AGV, for example. In an embodiment, the number of route 5 may be at least two, and when the number of route 5 is at least two, a movement time duration may be determined for each of candidate routes, and a shortest time route among the candidate routes may be determined as the final route of the automated guided vehicle AGV, for example.

In a process of determining the final route, the first controller 200 may check a previous automated guided vehicle disposed in front of the automated guided vehicle AGV on the route 5. The movement time duration may be determined based on the previous automated guided vehicle.

In a process of determining the final route, the first controller 200 may check an intersection automated guided vehicle intersecting the automated guided vehicle AGV at an intersection point. The movement time duration may be determined based on the intersection automated guided vehicle. Although a description is based on the movement time duration from the current point CP of the automated guided vehicle AGV to the first port 32, a movement time duration from the first port 32 to the second port 42 may be described in a same way.

As such, the departure management system 1000a, 1000b of the automated guided vehicle AGV may set the port priority PR2 based on the number of shelves 35 storing the article 20 among the shelves 35 adjacent to the first port 32, and reset the priority PR1 of the work order OD1 based on the port priority PR2. Since the number of the shelves 35 storing the article 20 is checked in the real time, the automated guided vehicle AGV may be departed preferentially to the first port 32 with a relatively large number of the shelves 35 storing the article 20. Therefore, the process efficiency may be effectively managed.

FIG. 5 is a flow chart illustrating a method of managing a departure of an automated guided vehicle performed by a departure management system of the automated guided vehicle. FIG. 6 is a flowchart illustrating in detail generating a movement order for moving an automated guided vehicle from a current point to a first port in a method of managing a departure of an automated guided vehicle in FIG. 5. FIG. 7 is a flowchart in detail resetting a priority of a work order in a method of managing a departure of an automated guided vehicle in FIG. 5.

A method of managing a departure of an automated guided vehicle AGV in FIG. 5 is substantially equal to the operation of the departure management system 1000a of the automated guided vehicle AGV in FIG. 3A and the operation of the departure management system 1000b of the automated guided vehicle AGV in FIG. 3B. Therefore, redundant descriptions are omitted.

Referring to FIGS. 1 to 7, the method of managing the departure of the automated guided vehicle AGV may include generating a work order OD1 for transporting an article 20 stored on shelves 35 adjacent to a first port 32 from the first port 32 to a second port 42 and setting a priority PR1 of the work order OD1 (operation S100), generating a movement order OD2 for moving the automated guided vehicle AGV from a current point CP of the automated guided vehicle AGV to the first port 32 based on the work order OD1 and the priority PR1 of the work order OD1 (operation S200), determining a queue value DB of the first port 32 which is a number of shelves 35 storing the article 20 included in the first port 32 (operation S300), and setting a port priority PR2 based on the queue value DB of the first port 32 and resetting the priority PR1 of the work order OD1 based on the port priority PR2 (operation S400). The method of managing the departure of the automated guided vehicle AGV may further include regenerating the movement order OD2 based on the work order OD1 and the reset priority PR1 of the work order OD1 (operation S500). In an embodiment, the article 20 may be a substrate loaded in a cassette 10.

In an embodiment, as the priority PR1 of the work order OD1 is higher, the work order OD1 may be more preferentially assigned to the automated guided vehicle AGV.

In an embodiment, generating the movement order OD2 for moving the automated guided vehicle AGV from the current point CP to the first port 32 (operation S200) may include determining a route 5 from the current point CP to the first port 32 (operation S210), determining a movement time duration of the automated guided vehicle AGV based on the route 5 (operation S220) and generating the movement order OD2 based on the movement time duration (operation S230). In an embodiment, a number of route 5 may be one, and when the number of route 5 is one, the one route 5 may be determined as a final route of the automated guided vehicle AGV. In an embodiment, the number of route 5 may be at least two, and when the number of route 5 is at least two, a movement time duration may be determined for each of candidate routes, and a shortest time route among the candidate routes may be determined as the final route of the automated guided vehicle AGV.

In an embodiment, resetting the priority PR1 of the work order OD1 (operation S400) may include determining whether a state of the first port 32 is a saturation state (operation S410) and setting the port priority PR2 when the state of the first port 32 is the saturation state (operation S420). Resetting the priority PR1 of the work order OD1 (operation S400) may further include adding the port priority PR2 to the priority PR1 of the work order OD1 to set a final priority of the work order OD1 to reset the priority PR1 of the work order OD1 (operation S430).

The state of the first port 32 may be determined based on a storage rate of the first port 32 corresponding to the queue value DB of the first port 32. When the storage rate of the first port 32 is higher than a reference value, the state of the first port 32 may be determined to be the saturation state. In an embodiment, the reference value may be 0.95. The storage rate of the first port 32 may be a ratio of the queue value DB of the first port 32 to a total number of shelves 35 adjacent to the first port 32. As the storage rate of the first port 32 increases, the port priority PR2 may increase.

As such, the method of managing the departure of the automated guided vehicle AGV may set the port priority PR2 based on the number of shelves 35 storing the article 20 among the shelves 35 adjacent to the first port 32, and reset the priority PR1 of the work order OD1 based on the port priority PR2. Since the number of the shelves 35 storing the article 20 is checked in a real time, the automated guided vehicle AGV may be departed preferentially to the first port 32 with a relatively large number of the shelves 35 storing the article 20. Therefore, the process efficiency may be effectively managed.

What is claimed is:

1. A method of managing a departure of an automated guided vehicle, the method comprising:
   generating a work order for transporting an article stored on shelves immediately next to a first port from the first port to a second port and setting a priority of the work order;
   generating a movement order for moving the automated guided vehicle from a current point of the automated guided vehicle to the first port based on the work order and the priority of the work order;
   determining a queue value of the first port which is a number of the shelves storing the article included in the first port;
   setting a port priority based on the queue value of the first port and resetting the priority of the work order based on the port priority; and
   automatically controlling movement of the automated guided vehicle from the current point to the first port based on the reset priority of the work order.

2. The method of claim 1, wherein, as the priority of the work order is higher, the work order is more preferentially assigned to the automated guided vehicle.

3. The method of claim 1, wherein, as the port priority increases, the priority of the work order increases.

4. The method of claim 1, wherein the resetting the priority of the work order based on the port priority includes:
   determining whether a state of the first port is a saturation state; and
   setting the port priority when the state of the first port is the saturation state.

5. The method of claim 4, wherein the state of the first port is determined based on a storage rate of the first port corresponding to the queue value of the first port, and
   wherein, when the storage rate of the first port is higher than a reference value, the state of the first port is determined to be the saturation state.

6. The method of claim 5, wherein the storage rate of the first port is a ratio of the queue value of the first port to a total number of the shelves immediately next to the first port.

7. The method of claim 5, wherein, as the storage rate of the first port increases, the port priority increases.

8. The method of claim 5, wherein the reference value is 0.95.

9. The method of claim 4, wherein the resetting the priority of the work order further includes adding the port priority to the priority of the work order to set a final priority of the work order to reset the priority of the work order.

10. The method of claim 1, further comprising:
   regenerating the movement order based on the work order and a reset priority of the work order.

11. The method of claim 1, wherein the article is a substrate loaded in a cassette.

12. The method of claim 1, wherein the generating the movement order for moving the automated guided vehicle from the current point to the first port includes:
   determining a route from the current point to the first port;
   determining a movement time duration of the automated guided vehicle based on the route; and
   generating the movement order based on the movement time duration.

13. The method of claim 12,
   wherein, when a number of the route is one, the route is determined as a final route of the automated guided vehicle, and
   wherein, when the number of the route is at least two, the movement time duration is determined for each of candidate routes, and a shortest time route among the candidate routes is determined as the final route.

14. A departure management system of an automated guided vehicle, the departure management system comprising:
   a first host which generates a work order for transporting an article stored on shelves immediately next to a first port from the first port to a second port and set a priority of the work order;
   a first controller which generates a movement order for moving the automated guided vehicle from a current point of the automated guided vehicle to the first port based on the work order and the priority of the work order;
   a second controller which determines a queue value of the first port which is a number of the shelves storing the article included in the first port; and
   a second host which sets a port priority based on the queue value of the first port,
   wherein the first controller resets the priority of the work order based on the port priority, and automatically controls movement of the automated guided vehicle from the current point to the first port based on the reset priority of the work order.

15. The departure management system of claim 14, wherein, as the priority of the work order is higher, the work order is preferentially more assigned to the automated guided vehicle.

16. The departure management system of claim 14, wherein, as the port priority increases, the priority of the work order increases.

17. The departure management system of claim 14, wherein the second host determines whether state of the first port is a saturation state, and sets the port priority when the state of the first port is the saturation state.

18. The departure management system of claim 17, wherein the state of the first port is determined based on a storage rate of the first port corresponding to the queue value of the first port, and
   wherein, when the storage rate of the first port is higher than a reference value, the state of the first port is determined to be the saturation state.

19. The departure management system of claim 18, wherein the storage rate of the first port is a ratio of the queue value of the first port to a total number of the shelves immediately next to the first port.

20. The departure management system of claim 18, wherein, as the storage rate of the first port increases, the port priority increases.

\* \* \* \* \*